United States Patent [19]

Eickmann

[11] Patent Number: 4,913,377
[45] Date of Patent: Apr. 3, 1990

[54] DEVICES WHICH MAY BE BORNE IN AIR AND ON DEVICES APPLICABLE THEREIN

[76] Inventor: Karl Eickmann, 2420 Isshiki, Hayama-machi, Kanagawa-ken, Japan

[21] Appl. No.: 236,873

[22] Filed: Aug. 26, 1988

Related U.S. Application Data

[60] Continuation-in-part of Ser. No. 909,435, Sep. 19, 1986, abandoned, and Ser. No. 829,637, Feb. 14, 1986, abandoned, which is a continuation-in-part of Ser. No. 483,977, Apr. 11, 1983, Pat. No. 4,571,157, which is a continuation-in-part of Ser. No. 308,202, Oct. 2, 1981, Pat. No. 4,452,411, said Ser. No. 909,435, is a division of Ser. No. 609,056, May 10, 1984, Pat. No. 4,613,098, which is a continuation-in-part of Ser. No. 308,202.

[51] Int. Cl.$^4$ .............................................. B64C 27/08
[52] U.S. Cl. ..................................... 244/17.11; 244/8; 244/17.15
[58] Field of Search .................. 244/6, 7 R, 7 A, 8, 244/17.11, 17.13, 17.15, 217; 416/23, 24

[56] References Cited

U.S. PATENT DOCUMENTS

| | | | |
|---|---|---|---|
| 2,344,945 | 3/1944 | Knox et al. | 244/217 |
| 2,372,481 | 3/1945 | Gagas | 416/24 |
| 2,450,992 | 10/1948 | Sanderson | 244/138 A |
| 2,456,485 | 12/1948 | Bendix | 416/24 |
| 2,483,480 | 10/1949 | Stalker | 244/17.15 |
| 3,900,176 | 8/1975 | Everett | 244/6 |

Primary Examiner—Joseph F. Peters Jr.
Assistant Examiner—Rodney Corl

[57] ABSTRACT

An air-borne craft is provided with at least two pairs of propellers with substantially vertical axes. One pair of the propellers is provided on the front portion of the craft, the other pair on the rear portion with one propeller of each pair on the left side and the other propeller of the same pair on the right side of the body of the craft. The propellers are provided on their rear directions with flaps which can open and close relative to the profiles of the propellers. The arrangement of at least four propellers secures an economical operation in case of emergency landing and at flight. In case of an engine failure the craft has still a forwardly directed speed. This speed will open the flaps and the flow of air against the flaps will revolve the propellers. Thereby at least one arm of each of the propellers remains acting like a helicopter blade and the four propellers can carry the craft in a gliding procedure, flying forwardly with an angle of descent, towards the ground for the emergency landing.

11 Claims, 5 Drawing Sheets

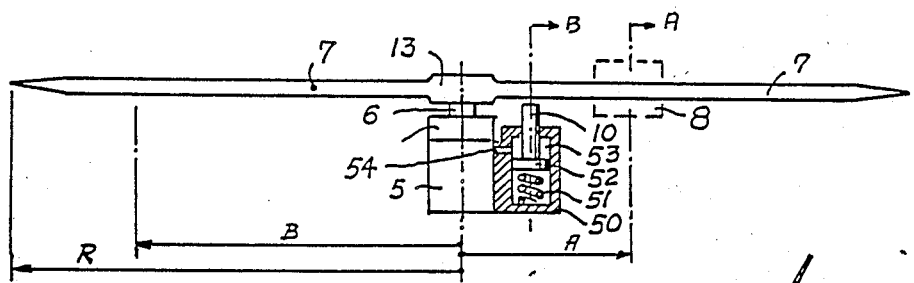
Fig. 6
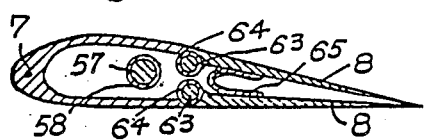
Fig. 7
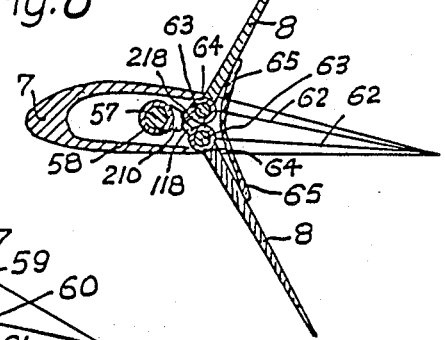
Fig. 8
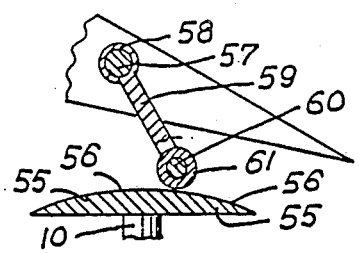
Fig. 9
Fig. 10
$$W = DRAG = (\rho/2) F\, C_W\, V_P^2$$
with $F$ = AREA OF BLADE, $V_P$ = VELOCITY OF "F" RELATIVE TO AIR, $C_W$ = COEFFICIENT OF DRAG.
$$B = 0.75\, R \qquad F_B = 0.5\, F_{BLADE}$$
$$W_{LEFT} = W_{RIGHT}:$$
$$(\rho/2)\, F_L\, C_{WL}\, V_L^2 = (\rho/2)\, F_R\, C_{WR}\, V_R^2$$
$$(\rho/2)\, F_L\, C_{WL}\, (2B\pi n/60)^2 = (\rho/2)\, F_R\, C_{WR}\, (2A\pi n/60)^2$$
$$F_L\, C_{WL}\, B^2 = F_R\, C_{WR}\, A^2$$
$$A = \sqrt{(F_L C_{WL}/F_R C_{WR})\, B^2}\, / \eta$$

Fig. 11

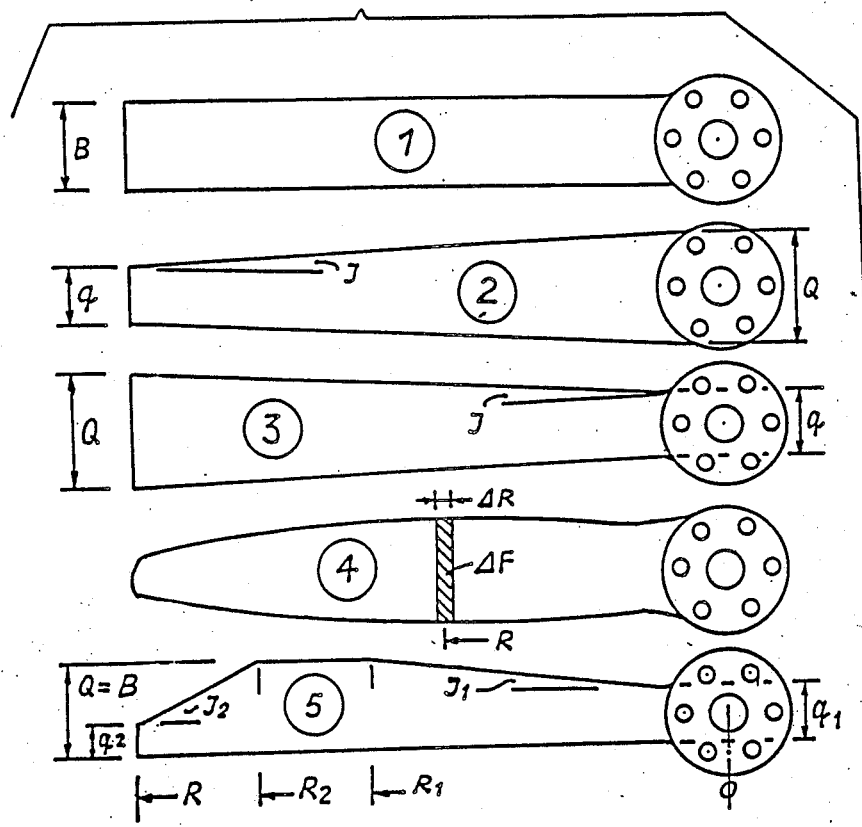

| TYPE | CALCULATION BY: |
|---|---|
| ① | $W = MBR^3$ or: $MB(R_2^3 - R_1^3)$ <br> $Md = SBR^4$ or: $MB(R_2^4 - R_1^4)$ |
| ② | $W = [QM(R_2^3 - R_1^3) - JS(R_2^4 - R_1^4)]$ <br> $Md = [QS(R_2^4 - R_1^4) - JT(R_2^5 - R_1^5)]$ |
| ③ | $W = [qM(R_2^3 - R_1^3) + JS(R_2^4 - R_1^4)]$ <br> $Md = [qS(R_2^4 - R_1^4) + JT(R_2^5 - R_1^5)]$ |
| ④ | $W = $ SUM OF $E(\tfrac{1}{2}) \Delta F (R_2^2 - R_1^2)$ <br> $Md = $ SUM OF $E(\tfrac{1}{3}) \Delta F (R_2^3 - R_1^3)$ } STEPWISE CALCULATION |
| ⑤ | $W = [q_1 M(R_1^3 - 0) + J_1 S(R_1^4 - 0)] + BM(R_2^3 - R_1^3) + [Q'M(R^3 - R_2^3) - J_2 S(R^4 - R_2^4)]$ <br> $Md = [q_1 S(R_1^4 - 0) + J_1 T(R_1^5 - 0)] + BS(R_2^4 - R_1^4) + [QS(R^4 - R_2^4) - J_2 T(R^5 - R_2^5)]$ |

$N = Md\omega$ $W$ = RESISTANCE
$Md$ = TORQUE
$N$ = POWER
$E = (3/2)\, G_w \cdot \omega^2$
$M = (1/3) E$
$S = (1/4) E;\ \bar{R} = Md/W$
$T = (1/5) E;\ N = \bar{R} W \omega$

Fig. 12

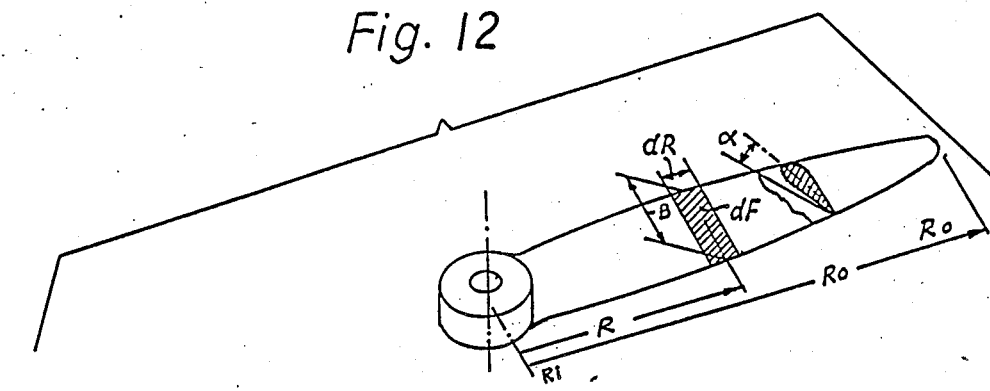

$\omega$ = angular velocity = 1/s     n = Rpm
$\omega = \pi n/30$;   $\pi = 3.14\cdots$
$g$ = density of air; f.e. 0.125 Kgs²/m⁴ near sea level.
$C_a$ = Coefficient of lift     Md = Moment = TORQUE
$C_w$ = Coefficient of resistance     Lift = $W(C_a/C_w)$
W = RESISTANCE     L = Lift
N = POWER REQUIRED     ( ) = Integral mean values
K = Konstant = $(g/2)C_w$     F = AREA
$W = (g/2) C_w F V^2 = K F V^2$     $L = (g/2) F C_a V^2 = W(C_a/C_w)$
$V = 2R\pi n/60 = m/s =$     $V = R\omega$
$E = K\omega^2$     $M = (1/3)E$     $S = (1/4)E$     $T = (1/5)E$

DEVELOPMENT OF THE FORMULAS:

$dV = \omega dR$;     $V = \int \omega dR$     $V = \omega R$     $\bar{V} = \int \omega dR/\Delta R = \frac{1}{2}\omega R^2$ $dW = K\omega^2 dF R^2 = ER^2 dF = ER^2 dB dR$
$W = \int dW = \int ER^2 \bar{B} dR = E\bar{B}\int R^2 dR = E\bar{B}(1/3)(R_2^3 - R_1^3)$ if B is constant, as in TYPE ①

$dMd = K\omega^2 R^3 dF = ER^3 dF = ER^3 dB dR$
$Md = \int dMd = \int ER^3 \bar{B} dR = E\bar{B}\int R^3 dR = E\bar{B}(1/4)(R_2^4 - R_1^4)$ if B is constant For B linear inclined:  ⎯⎯⎯⎯⎯⎯J: J introduced. $J = (\Delta Q/\Delta R)$ TYPE ③:  $W = E(q + JR) R^2 dR = Eq \cdot 1/3 R^3 + EJ \cdot 1/4 R^4$
        $Md = E(q + JR) R^3 dR = Eq \cdot 1/4 R^4 + EJ \cdot 1/5 R^5$ TYPE ②:  $W = E(Q - JR) R^2 dR = EQ \cdot 1/3 R^3 - EJ \cdot 1/4 R^4$
        $Md = E(Q - JR) R^3 dR = EQ \cdot 1/4 R^4 - EJ \cdot 1/5 R^5$

OR:

TYPE ③:  $W = Mq(R_2^3 - R_1^3) + SJ(R_2^4 - R_1^4)$
        $Md = Sq(R_2^4 - R_1^4) + TJ(R_2^5 - R_1^5)$

TYPE ②:  $W = MQ(R_2^3 - R_1^3) - SJ(R_2^4 - R_1^4)$
        $Md = SQ(R_2^4 - R_1^4) - TJ(R_2^5 - R_1^5)$

TYPE ⑤:  CALCULATE INNER-MEDIAL-AND OUTER-PORTIONS BY ABOVE EQUATIONS.
        FOR OUTER PORTION USE Q' INSTEAD OF Q.   $Q' = q_2 + J_2 R$   $(R = R_0 \text{ obite})$

DEVICES WHICH MAY BE BORNE IN AIR AND ON DEVICES APPLICABLE THEREIN

REFERENCE TO RELATED APPLICATION

This is a continuation in part application of my at the filing date copending applications Ser. Nos. 06-909,435 and 06-829,637 which will become abandoned after filing of this present application. Applications 909,435 and 829,637 were filed on Sept. 19, 1986 and on Feb. 14, 1986 as divisional or continuation in part applications of earlier applications Ser. Nos. 06-609,056, filed on May 10, 1984, now Patent No. 4,613,098, issued Sept. 23, 1986 and of Ser. No. 06-483,977, filed on Apr. 11, 1983, now Pat. No. 4,571,157, issued on Feb. 18, 1986. These mentioned both applications were continuation in part applications of my still earlier application Ser. No. 06-308,202 which was filed on Oct. 02, 1981 and issued as Pat. No. 4,452,411 on June 05, 1984. Benefits of the before mentioned earlier applications are claimed for this present invention.

BACKGROUND OF THE INVENTION

1. Field of the Invention

This invention relates to flying or floating craft and to devices which utilize a flowing fluid or movement of a body in fluid to create a rotation and/or lift or thrust.

2. Description of the Prior Art

Helicopters were commonly provided with an autorotation arrangement. However, the descending speed of the helicopter in autorotation is rather high. The "descent-speed slow down"-maneuver is a delicate procedure which often fails and the helicopter crashes.

The trend in development of helicopters is presently to reduce the weights. Also the weights of the rotors becomes reduced. That reduces as a side effect the time of the landing maneuver in autorotation and thereby increases the chance of failure of the landing maneuver, whereby the likeliness of a crash increases, when the engine of the helicopter fails.

In motor powered gliders it was custom in the former art to swing a motordriven propeller into and out of the craft, when a change-over from motorless gliding to powered gliding and vice versa was desired. The swing out of the propeller resulted in a negative influence on the flight path of the glider. The sudden appearance and disapparance of the drag of the propeller brought a negative influence on the speed and stability of the glider in the surrounding air.

SUMMARY OF THE INVENTION

It is the main object to overcome the problems and difficulties of the described former art and, in addition, to provide a fluid flow responsive thrust and/or rotation providing device.

Another object of the invention is to provide to a helicopter a capability to glide similar to a glider down to the earth under an angle of inclination relative to the ground when the power plant of the helicopter fails.

More objects of the invention are, for example; to provide:

A device which may be capable of travel in air, for example, a helicopter or an aircraft, or devices which may be applied therein or in other vehicles or machines, wherein a fluid-stream responsive thrust arrangement is provided, which may be a fluid flow responsive, propeller containing, thrust providing, unit or a resistance body extendable and retractable provided to an arm of a propeller;

or, wherein an arrangement is provided which automatically changes a helicopter into a glider, borne on revolving propellers, when the power plant(s) respectively fails (fail).

Still a further object of the invention is to provide strong traction forces to the aircraft and to provide high lifting forces to a vertically taking off and landing craft by the provision on pluralites of propellers or propeller pairs on the craft. Because I have found that with equal installation and use of power the traction and lifting capabilities of aircraft and helicopters can be drasticly improved by the application of plural propellers or propeller pairs to the installed and available equal power. This feature is obtained by my following analysis of the technologies involved:

PARTIAL ANALYSIS OF THE TECHNOLOGIES INVOLVED IN THE INVENTION

At common aircraft-technology it was assumed, that it would be the most economic way to drive a propeller by mounting the propeller directly onto a flange of a crankshaft of the aircraft engine. By setting the propeller directly onto the crankshaft of the engine losses of transmissions should be prevented. Because, when a transmission is used between an engine and a means driven by the engine, there will be losses in the transmission.

This assumption of the common aircraft technology, which makes at the first glimpse the impression of being absolutely true—simply because it is true that a transmission has losses—is however, as the inventor of this application found, under certain circumstances a disastrous-error, which has considerably prevented the advancement of flight-technology.

This will be visible at hand of FIG. 1 of this specification.

It is generally known from Newtons law of force, that the force equals the mass multiplied by the accelleration, according to equation: (1)

$$\text{Force} = \text{mass} \times \text{accelleration; or: } F_k = m \cdot a \quad (1)$$

The mass of air, which flows through the propeller circle of FIG. 1 is:

$$M = \rho \cdot F \cdot V_1 \quad (2)$$

And, since it is required to accellerate the mass of air, when it flows through the propeller circle from the velocity "Vo"=zero to the final velocity "V2", the accelleration of the mass of air, when it flows through the propeller circle is:

$$a = V_2/\text{second} \quad (3).$$

Consequentely, the force obtained by Newton's $$F_k = \rho F \, V_1 V_2 / S \quad (4)$$

And, since it is known from the theorem of Freude, that the velocity through the propeller circle is the mean value of the velocities before and after the propeller circle, namely:

$$V_1 = (V_o + V_2)/2 \quad (5)$$

the force, which is required to keep an airborne craft with vertical propeller axis (axes) in hovering without ascend and descent is:

$$F_k = \rho F V_1 V_2 = \rho F V_1 2 V_1 = \rho F 2 V_1^2 \qquad (6)$$

Or, with I=impulse:

$$I = m2V_1 = 2SFV_1^2 = H = S \qquad (7).$$

The kinetical energy in the air-stream behind the propeller is:

$$E_k = \frac{m}{2}(2V_1)^2 = 2\rho F V_1^3 = N \qquad (8)$$

Equation (2) can be transformed to V1, to be:

$$V_1 = \sqrt[3]{N/2\rho F} \qquad (9)$$

and the "V1" of equation (3) can be used to be inserted into equation (1), whereby the followings are obtained:

$$H = S = 2\rho F \left[ \sqrt[3]{N/2\rho F} \right]^2 \qquad (10)$$

or:

$$H = S = 2\rho F \sqrt[3]{N/2\rho F} \sqrt[3]{N/2\rho F}$$

or: $H^3 = S^3 = 8\rho^3 F^3 \dfrac{N}{2\rho F} \dfrac{N}{2\rho F}$ or: $H^3 = S^3 = \dfrac{8}{4} \rho F N^2$ or:

$$H = S = \sqrt[3]{2\rho F N^2} \qquad (11)$$

or:

$$N = \sqrt{S^3/2\rho F} \qquad (12)$$

In the above equations the following values may be used:
$\rho$=density of air (for example: in kg s$^2$/m$^4$)
N=Power (for example in kgm/s)
S=H=lift of thrust (for example; in Kg.)
I=Impuls (for example in Kg.)
V1=velocity of the air in the propeller-circle (f.e. in m/s)
m=mass of air in the flow (for example Kgmass=Kg/9,81)
F=are of propeller-circle (for example in m$^2$.).

As a first step to explain my invention, I introduce "M" which shall define the number of propellers, which will be used in my craft. For comparison with conventional helicopters it should be understood, that equal diameters of propellers are considered. Also the forms, pitches, configurations and like shall be the same, when propellers are compared.

As second step I introduce the efficiency of a transmission and call it "$\eta$". The transmission may also be my hydraulic transmission of a plurality of separated flows of fluid of equal rate of flow in the flows.

I now introduce "$\eta$" and "M" into equation (11) whereby equation (11) transforms to:

$$H = S = M \sqrt[3]{2\rho F \left(\frac{\eta N}{M}\right)^2} . \qquad (13)$$

This equation (13) now shows already some very interesting surprises, which will be found to be important means of the present invention.

For example:

The equation explains, that the lift is as greater as the number "M" of the propellers is.

And, the equation has the further surprise, that the lift will not be reduced parallel to the losses in the transmission, but only with the third root of the second power of the efficiency-losses.

These features, which my equation explaines, are obtained at the given power. Or, in other words, my equation shows, that, when a certain power is available, the lift or ability to carry, of an airborne craft will increase, when the number "M" of the propellers is increased and when done so, the losses which may appear in a transmission which transfers the power to the plurality of propellers will not reduce the lift or carrying capacity in the same ratio as the losses reduce the power in the transmission, but less, namely only with the third root of the second power.

In short, my equation shows, that with increasing the number of the propellers, an increase of lifting capacity or of carrying power, can be obtained.

As a next step to explain my invention, I assume, that in equation (13) equal values will be used for a comparison of a conventional helicopter with a plural propeller craft of my invention. Equal values in equation (13) mean, equal power "N", equal values "2"; equal values of density "$\rho$" and equal values of propeller-dimensions, including equal values of cross-sectional areas "F" through the propeller-circles. For a comparison of flight-technology-systems the equal values can simply be left out of equation (13) and I so obtain my comparison equation (14) which shows my comparison-factor "Ftl"; namely:

$$F_{TL} = M \sqrt[3]{\frac{\eta^2}{M^2}} \quad \text{or:} \quad F_{TL} = \sqrt[3]{M\eta^2} . \qquad (14)$$

With this equation it is possible to calculate a comparison diagram, wherefrom the comparison factor "Ftl" can immediately be seen and which shows, how many times lift a machine with a certain number of propellers and a certain transmission efficiency will give, compared to other or conventional craft. This diagram will be shown in FIG. 17.

The common helicopter has the Ftl value 1 minus the mechanic transmission losses and minus the power which is required to drive the tail rotor. In short, the common helicopter may have a Ftl value of 0.75 to 0.85.

Herebefore the thrusts, lift-forces, thrust-forces and power for the obtainment of certain forces have been calculated for the condition, that the propeller(s) does (do) not move in the direction of the axis(axes). In other words, the equations above are valid for propeller(s) in stand, but not for propeller(s) in movement in the direction of the axes of the propellers.

At the later to be discussed range of flight the craft moves substantially forward in levelled hight speed flight, where the resistance of the craft in air at the respective speed is in balance with the traction of the propeller(s). I call this range the "flight-range". Contrary thereto, the range where the propeller does no move, where the propeller is at stand or where the craft is hovering, in short, where the above discussed equations apply, we have an other range, which I call the "stand-range" or the "howering-range".

But, according to my "Handbook of my Flight-Technology" there is another range, a range between the stand-range and the flight-range. This range therebetween is called the "inter-thrust-range" in my handbook.

At this Inter-Thrust-Range the craft may permanently change its speed, for example, accelerate. The Inter-Thrust-Range can thereby also be assumed to be an acceleration-range.

At the said "Inter-Thrust-Range" the thrust of the propeller(s) is gradually decreasing when the velocity of the craft increases. The details of this situation and condition are exactly defined by my following equations for thrust of a propeller or of propellers in the inter-thrust-range:

$$S_i = 2 N_{iN} \times \qquad (15)$$

$$\overline{\eta_G}\left(V_0 + \sqrt{V_0^2 + \left[\sqrt[3]{76\rho MFN^2}/SMF\right]}\right) = K_{gi}$$

or:

$$S_i = N_{iN} \times \overline{\eta_G}/(V_0 + \sqrt{V_0 + 2S_{ibm}/SMF}) = Kg. \qquad (16)$$

The development of the above equations for the Inter-Thrust-Range can be seen in my "Handbook of my Flight-Technology". The first equation of the two equations, namely equation (15) is the more simple equation in actual calculation. The latter equation (16) is the more accurate equation, but it is more difficult and more time consuming in actual calculation procedure.

At the later "Flight-range" when the craft is flying substantially horizontally in levelled flight parallel to the surface of the earth, and, when the resistance of the aircraft during move in air is in balance with the traction force(s) of its propeller(s); or, in other words, when thrusts of the propellers equals resistance of the craft, but thrusts and resistance are opositionally directed, the following equation is valid:

$$W = (\rho/2) C_w A V_o^2 \qquad (17)$$

and further, also the following equation will be applicable:

$$N = W \times V_o \qquad (18).$$

I now insert equation(11) into equation (12) and obtain:

$$N = (\rho/2) C_w A V_o^2 V_o \qquad (19);$$

which I transform to:

$$V_0 = \sqrt[3]{2 \ N_{out}/\rho C_w A} \qquad (20)$$

whereby I have a possibility to immedately calculate the expected velocity of an airborne craft or aircraft in its flight-range.

In the above flight-range equations, the following values may be used:

W = Resistance of craft in Kg.
$\rho$ = Density of air, for example: 0.125 Kgs$^2$/m$^4$ close to oceanlevel;
A = Projection of wings (airfoil) in m$^2$
Cw = Coefficient of resistance; dimensionless;
N = Power in Kgm/sec;
Vo = Velocity of craft relative to air in m/sec..

Equation (14) can also be written in the following form:

$$V_o = \sqrt[3]{\frac{1}{A}} \times \sqrt[3]{2N_{out}/\rho C_w} \qquad (21)$$

The latter equation shows directly the influence of wing-area's vertical projection and also the influence of power and of the permanent values for the range of flight. For further defining the influence of power and the influence of the permanent values, the equation (21) may also be written as:

$$V_0 = \sqrt[3]{\frac{1}{A}} \times \sqrt[3]{2N_{out}} \times \sqrt[3]{\frac{1}{\rho C_w}} \qquad (22)$$

and thereby all important influences for the speed which can be obtained in the flight range are directly visible.

With the above equations all conditions for vertical take off, for vertical landing, for the accellerations at the Inter-thrust-range and for actual horizontal levelled flight can be pre-determined and be exactly calculated in advance. The substantial correctness of the equations has been proven in actual testing in my research laboratory.

With these equations diagrams can be developed which show in detail and in advance which kind of craft are the most economical for take off and for flight.

From said equations and diagramms it can be found, that even, when hydrostatic transmissions of my hydraulic systems are arranged between a power plant, like an engine or a gas-turbine and a plurality of propellers, a substantially higher lifting capacity can be obtained than would be obtainable at the same power installation from a single propeller, if flanged onto the crank-shaft of the power plant. This is at least true for the vertical start or take off, for the substantially vertical landing and for flight with moderate forward speed. Only at a high forward speed will the single propeller per engine be of higher economy.

Consequentely, it is more economical, according to this invention, to use a power plant to drive or create a plurality of separated fluid flows of substantially proportionate or equal rate of flow and driven thereby a plurality of propellers over fluid motors which are arranged at suitable locations on the craft. These theories are further condition to the fact, that at comparisons equal total power is installed and that the compared propellers have equal dimensions like equal diameters, sizes and pitches. The comparison can not be valid, if in the common craft other dimensions of propellers or power would be used, compared to those of the invention.

Therefore, according to the invention, an airborne craft may be driven by a plurality of propellers which are driven by hydraulic fluid motors, wherein the fluid motors are driven by separated fluid flows of equal rate of flow which are created in multi-flow pumps or hydrofluid conveying engines and wherein the pump(s) are driven or prime moved by a respective power plant or engine(s).

BRIEF DESCRIPTION OF THE DRAWINGS

FIG. 6 shows a propeller seen from the rear and a portion in section.

FIG. 7 shows a cross-sectional view through FIG. 6 along arrowed line A.

FIG. 8 shows a view as in FIG. 7, however with a modification.

FIG. 9 shows a cross-sectional view through FIG. 6 along the arrowed line B.

FIG. 10 shows a mathematical evaluation and analysis.

FIG. 11 demonstrates a mathematical analysis with formulas, and:

FIG. 12 demonstrates how the formulas of FIG. 52 were developed.

DESCRIPTION OF THE PREFERRED EMBODIMENTS

Figure 1:
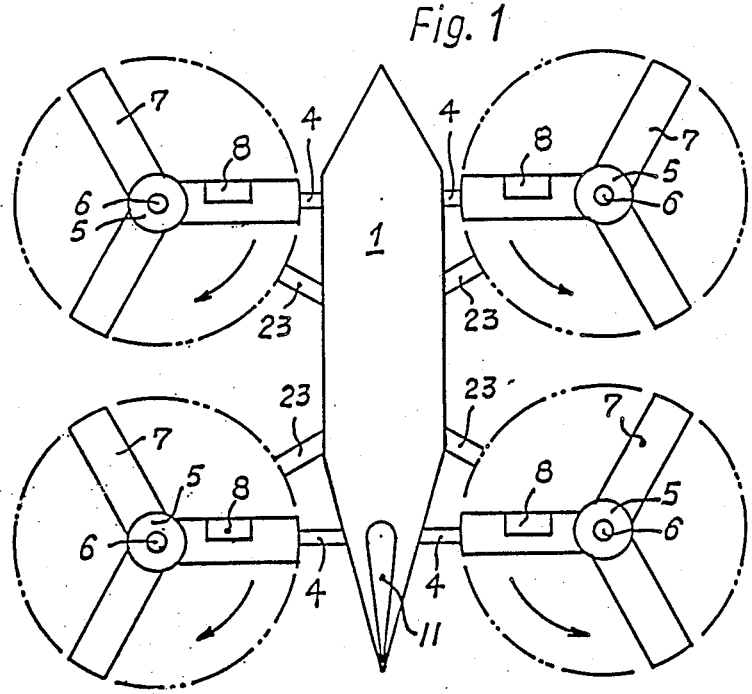
FIG. 1 shows an aircraft of the invention seen from above.
Figure 2:
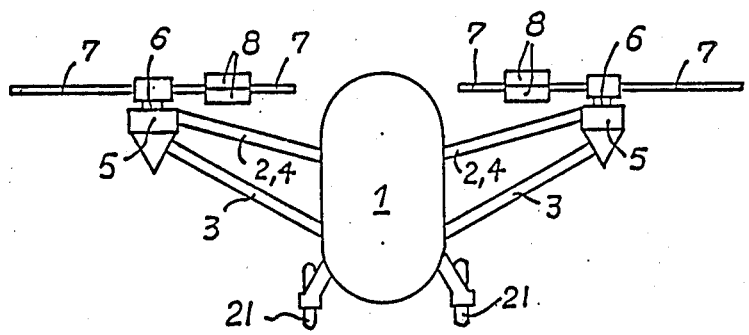
FIG. 2 shows the craft of FIG. 1 seen from the front of it.

FIGS. 1 and 2 define a craft of the invention, which is simple and inexpensive and which is provided with an accident prevention device. The accident prevention device transforms the helicopter of these figures into a glider. By transforming the craft from a helicopter into a glider in accordance with this invention, the possibility of crashing of the craft after auto-rotation and failure of the landing maneuver out of auto-rotation is prevented. The craft therefore is more safe and can afford a gliding as a glider does. Thus, when all power plants of the engines fail or the driving of the propellers has otherwise failed, the craft does not need to crash but can fly on in the same style as a glider does. If the craft is heavy and the propellers are small, the gliding angle may however be of a steeper inclination than that of a high performance glider of the present time.

Body 1 carries the power plant and the transmission to the drive means 6 to revolve the plural helicopter propellers 7 on both sides of body 1. Body 1 also may be provided with a side rudder 11 and with wheels, skids or floats 21. As drive means to revolve the propellers 7 any suitable means may be applied, as described above. The propellers 7 might also be driven by individual power plants, which then must not be located in the body 1. I, however, prefer to have at least one power plant in body 1 to drive a multi-flow hydraulic pump which leads through holders 2,3,4 fluid to and return from fluid motors 5. Each fluid motor 5 is driven by an individual flow of fluid and revolved with equal rotary velocity or with proportionate rotary velocity relative to an other one of the fluid motors 5. The propellers 7 are fastened to the revolving shafts 6 of the fluid motors 5 and they are driven thereby in normal multiblade helicopter flight. In the figures the rotary directions of the propellers 7 are, however, in the directions of the arrows in FIG. 1. This is important in this arrangement.

According to the invention, the propellers are on portions of their trailing edges of the chords provided with resistance providing drive bodies 8. They may be swing plates, as later will be seen in other figures. Normally the bodies 8 are parallel to the skin of the propellers and they are then almost invisible. They are then just a portion of the airfoil section of the propeller blade(s).

If now an accident occurs, and the drive means to drive the propellers 7 stops, the craft has still a forward flight speed. A means of the invention is then provided to open the bodies 8 and thereby to actuate them. The forward speed of the craft now acts against the bodies 8 at their respective backwards swings. (See hereto the arrows in FIG. 1). The forward speed of the craft provides an airflow against the resistance bodies 8. (See FIG. 2). The airspeed now acts against the bodies 8 and tries to run them along with the equal air speed, which the body 1 has relatively to the air. Since the bodies 8 are arranged closer to the center of the propellers 7 than the tips of propellers 7 are, the propeller blades which are on the opposite sides of the center of the propellers 7 in forward swing have tips which run with higher speed than the air speed is and than the bodies 8 are running. This higher speeds of the outer portions of the propeller blades are now providing a lift. The lift may be almost as high as the lifting force was, when the propellers 7 were driven by the power plant. However, that is the case only when the craft maintains a high forward speed. The pilot will therefore try in such an emergency situation to run his craft to these Figures with high forward speed.

The faster the forward speed is, the higher becomes the rotary velocity of the propellers 7 and as smaller becomes the angle of inclination of the gliding flight. The bodies 8 of this present embodiment of the invention are thereby taking over the emergency propeller drive functions of the propeller sets.

A description of details of preferred embodiments of resistance bodies 8 is given, for example, in FIGS. 3 to 10. The words "pivotable" or "pivotably" define the ability to pivot.

Figure 3:
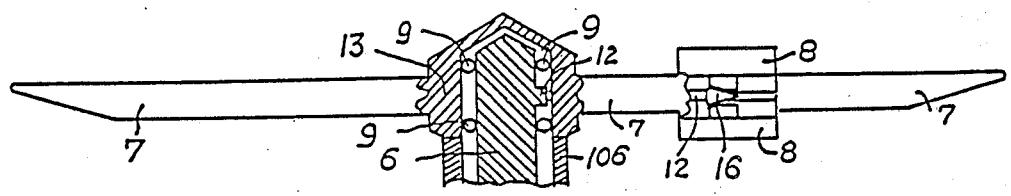
FIG. 3 is a longitudinal sectional view through a propeller, partially seen from the rear of it.
Figure 4:
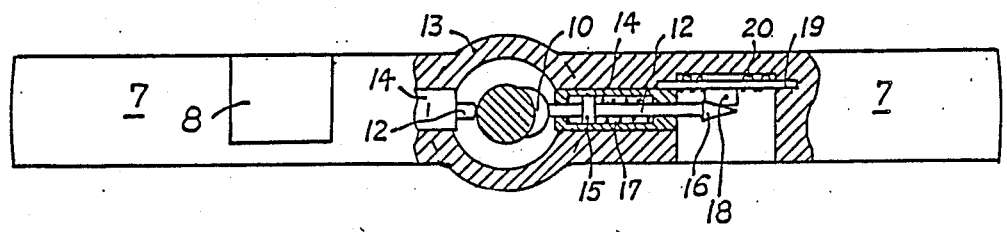
FIG. 4 shows the propeller of FIG. 3 partially from above, partially by a horizontally laid sectional view.

In FIGS. 3 to 4 the free-wheeling arrangement or one-way clutch arrangement 9 is provided between shaft 6 and propeller center housing 13. The propellers 7 have the resistance bodies 8. These are, however, in the radial inner or medial portions of the arms 7 of propeller 7 located. The resistance bodies 8 are serving as in the helicopter of FIGS. 1, 2. The Figures demonstrate the actuation of the resistance bodies 8. The resistance bodies may be plates 8. The resistance bodies are pivotably borne on a radially or substantially radially extending pivot bar 19 in propeller 7. Springs 20 may be provided to keep the resistance bodies 8 within the propeller blade airfoil section, for example in spaces 107. The bodies 8 are then fully retracted into the propeller blade, for example, as seen in the left portion of FIGS. 3 and 4. Shaft 6 is preferred to be stationary, while drive means 106 drives the propeller 7, when the power plant operates. When the driving means 106 fails, the free wheel means 9 permits the revolution of the propeller 7 around the stationary control shaft 6.

Control shaft 6 is provided with a control cam 10. A radially moveable piston 12 is provided in a guide 14 and subjected to the spring 17 on holder 15 of piston 12. The spring 17 presses the control piston 12 radially inwards towards the center of the propeller 7. The piston 12 has a top portion 16 which is preferredly formed as a taper.

Figure 5:
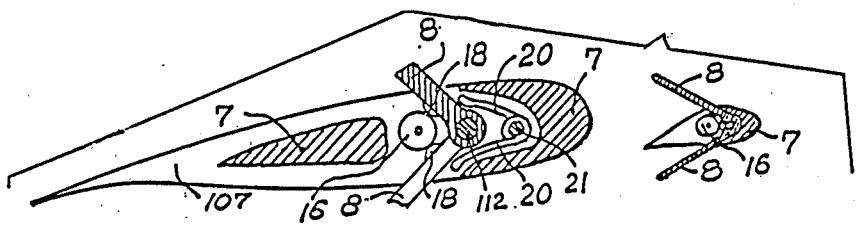
FIG. 5 is a cross-sectional view through FIG. 3 along the arrowed line.

When the arm 7 of the propeller spins around, the inner end of piston 12 is freely revolving in the interior space or propeller hub in the center housing 13. But when the piston 12 nears the control cam 10, and then moves over the control cam 10, the inner portion of piston 12 meets cam 10 and the piston 12 is thereby pressed radially outwards. Piston head 16 then meets the thrust portions 18 of the resistance bodies 8, presses against them and thereby with entering of the taper 16 into the thrust portions 18, the resistance bodies 8 are forced to open by swinging around the pivot axes 19. The blades or resistance bodies 8 are thereby spread outwards as long as the inner end of piston 12 moves over the stationary control cam 10. As this move over cam 10 is done, the springs 17 force the piston 12 back into the innermost position of rest; the springs 20 are forcing the arresting bodies 8 back into their innermost positions in the propeller airfoil, because the piston head moves away from the thrust portions 18 and out of the space between them. FIG. 5 is an enlargement of the section through FIGS. 3, 4, respectively to show the details more clearly. The size, location and configuration of cam 6 thereby decides at which angles of rotation the resistance bodies 8 are in the innermost position in the propeller blade and thereby not affective and at which angles of rotation the resistance bodies 8 are moved partially or entirely into their outermost and thereby outer position, which is the position and location of extension out of the airfoil section of the propeller blade 7 and thereby the effective position which provides the drive for rotating the propellers 7 at forward flight speed in the gliding action of the craft, for example of FIGS. 1 and 2.

Still a further modification to operate the resistance bodies 8 is shown in FIGS. 6 to 9 and a calculation is given in FIG. 10.

FIGS. 6 to 9 thereby demonstrate an arrangement to control the activity of the resistance bodies 8. Drive means, for example fluid motor, 5 may revolve the shaft 6 which holds the propeller 7. A free-wheeling arrangement may be provided in drive motor 5 or in the propeller center portion 13. This embodiment of the invention now provides a control housing 50 with a piston 52 moveable therein. Spring 51 presses the piston 52 into the upwards position to engage and actuate the resistance bodies 8, for example, to engage their feelers 60,61 and press them upwards.

However, as long as the motor 5 operates, or the power plant of the craft operates, a fluid under pressure is led through passage 54 into the other cylinder portion 53 of body 50 onto the spring-remote end of the piston 52 to force the piston 52 downwards and against the spring 51, thereby compressing the spring 51. When the power plant operates, the thrust portion 10 of piston 52 can thereby never meet the feeler 60,61 of the resistance body 8's control arrangement. The resistance bodies 8 are thereby automatically and at all times remaining in their innermost and ineffective positions of location within the airfoil section of the respective blade 7 of propeller 7. This innermost or ineffective location of the resistance bodies 8 is clearly demonstrated in the enlargement FIG. 7 of the cross-sectional view through the propeller along the right arrow in FIG. 6.

However, when now the power plant fails to operate, or, when the Oilmotor or fluid motor 5 fails to get oil under pressure or fluid under pressure, there will also be no pressure in the fluid in fluid passage 54. The spring 51 then immediateley presses the piston 52 upwards in control housing 50, whereby the upper control end 10 of piston 52 enters the location of the feeler 60,61 of the resistance body operation arrangement. FIG. 9 shows the control end of piston 52 in a greater scale. Thereby it is also shown that the piston end 10 may carry a control cam 55 with a guide face 56 of a specifically curved configuration. As soon as the pressure is lost in passage 54 the control face 56 is now within the defines of movement of the feelers 60,61 of the control arrangement to control the operation of resistance bodies 8. The feelers may consists of a swing arm 59 with rollers 61 borne on an axis or bar 60. When the rollers 61 are rolling the control or guide face 56 of cam 55, the swing arm 59 becomes angularly pivoted around its pivot bar 57. Pivot bar 57 may be borne in bearings 58. FIG. 9 is thereby principially a section along the left arrow in FIG. 6. Pivot bar 37 extends radially in the propeller arm 7 towards the location of the right arrow in FIG. 6 and is, therefore, also visible in cross-sectional FIGS. 7 and 8. So are the bearing members 38. The pivotion of bar 37 by the rolling of feeler rollers 61 over the guide face 56 brings the cam(s) 110 in FIG. 8 into engagement with the thrust portions 118 and 218 of the resistance bodies 8. Thereby the resistance bodies 8 are pivoted around their pivot bars 63 into the outer position outwards of the propeller blades airfoil section.

FIG. 8 shows the resistance bodies 8 in their outermost or effective location or position.

FIG. 7 shows the resistance bodies 8 in their innermost or ineffective position within the airfoil of the propeller blades.

When the feeler roller 61 has departed from the guide face 56 of cam 55 of piston 10, the swing arm 59 moves down again and the resistance bodies 8 return under the force of closing springs 65 into their innermost and ineffective location and position inside the outer configuration of the airfoil of the propeller blade. The guides 62 may be provided in the airfoil or propeller blade to hold the resistance bodies 8 in their innermost positions. The resistance bodies 8 then form, as seen in FIG. 7, a portion of the airfoil shape of the respective propeller blade 7. Pivot bars 63 may be borne in bearings 64. As soon as the power plant works again, the pressure in fluid will enter into space 53 and press the piston head 10 downwards together with piston 52 in control housing 50. The arrangement 50,10, 55,56 can then not interfere any more with the feeler 59,60,61 and the resistance bodies 8 are remaining in their innermost and ineffective locations of FIG. 37 inside of the airfoil section of the propeller blade. It will be easily understood from this explanation, that the location and size, as well as configuration of the members 55,56 in combination with the entire arrangement, will strictly define at which angular intervals of revolution of the respective propeller blade 7 the respective resistance bodies 8 are in the effective or in the ineffective position and location.

FIG. 10 gives a mathematical explanation in relation to FIG. 6, at which distance from the center axis of the propeller 7 the resistance bodies 8 should be located. This distance is "A" and a mathematical relationship to the distance "B" of the concentrated medial calculation point of the propeller arm. "Eta" in the final equation of FIG. 10 demonstrates the losses which will appear and "Vo" is the forward speed of the craft. The resistance bodies 8 would provide the speed "Vo" to arm length distance "A", if the arrangement would be one hundred percent effective, whereby "eta" would be "1". The lift of the propeller arm would then be:

$$L_L = (F_1/2) \, C_{LL} \, (\rho/2) \, (2A\pi n/60)^2$$

or: $L_L = (F_2/2) \, C_{LL} \, (\rho/2) [(F_L C_{wl} / FRC_{wR}) \, B^2/\eta.]$ When calculating the lift of the propeller arm through by the above equations, it will be found that at high forward speed "Vo" of the craft the lift of the propeller arm remains considerable and the propellers are thereby capable of bearing the craft in a gliding flight under a certain inclination towards the ground. The pilot will have time to look for a suitable emergency landing place and be able to afford an emergency landing with the comfort of less risk of failure than with "autorotation flare out" of a helicopter.

In the above equations the drag factor Cw of the resistance body 8 is much higher than the drag factor of the opposite propeller arm. For example, the drag factor of resistance body 8 may be about "Cw"=0.8 to 1.1; while the drag factor of the opposite propeller blade may be about "Cwl"=0.02 to 0.10. In the difference of the drag-factors the basis is given for the working effect of the arrangement of the resistance bodies 8 to drive the revolving of the propellers in accordance with this embodiment of the invention.

FIG. 11 gives simple calculation formulas for a number of configurations of propellers. These calculations are first estimates and do not claim absolute accuracy. However, the accuracy appears to be close enough for first estimates of the resistances, which are also called drag(s) and for the torques of the respective propellers. Also, from them the integral medial radii can be found and the power(s) required. These formulas are, for example, very helpful to design the resistance or drag bodies or flaps 8,88 of the invention, to change a helicopter into a glider, when the engine('s) or power supply(ies) fail. They are also helpful for the calculation of the blades of helicopters generally.

FIG. 12 explains, how I have developed the equations of FIG. 11. Since everything in FIGS. 11 and 12 is written in strictly useable mathematical terms with defined technological sizes and configuration(s), the FIGS. 11 and 12 are self-explanatory and do not require any further description here. If further information is desired, the inventor might be contacted at his permanent residence, which will appear on the applied for patent. It is recommended to calculate the respective propeller for 1000 RPM. Any other values for other RPM can then be found by multiplying the obtained value with the 2nd power of the fraction (RPM/1000, namely by: (RPM/1000)$^2$.

What is claimed is:

1. An airborne craft, comprising, in combination, a body with at least two pairs of holding means with one holding means of the respective pair of holding means extending to the left from said body while the other holding means of the respective pair of holding means extends to the right from said body with one of said pairs constituting a front pair of holing means provided on the front portion of said body and another pair of said holding means, constituting a rear pair of holding means, provided on the rear of said body, individual propellers of equal size and air foil configuration relative to the surrounding air with said propellers revolvably borne on said holding means at least indirectly, a power plant provided on said craft, transmission means between said power plant and said individual propellers to revolve said propellers, a means to divide the power of said power plant into at least four equal individual fractions of power with the number of said fractions equal to the number of said propellers, individual transmission portions of said transmission means with said individual portions provided for the transfer of said individual fractions of power to the respective propellers, overrunning free wheeling arrangements between said transmission portions and said individual propellers, wherein three blades are provided by each of said individual propellers with said blades angularly equally spaced from the center of the respective propeller, wherein the propellers on the right side of said body are subjected to anti-clockwise revolution while the propellers on the left side of said body are subjected to clock-wise revolution, wherein individual flaps are provided on the radial inner and rear portions of said blades of said propellers with said flaps borne with their roots in pivot beds of said blades to permit said flaps to pivot from an angle substantially parallel to the chord of the respective blade to an angle inclined to said chord, and vice versa, and, wherein a control means is provided on said craft to effect the inclination of the longitudinal axis of said craft relative to the horizon for inclining the front of said craft slightly downwards when said power plant fails, whereby said propellers are forced to continue to revolve due to the air flows against the rears of said flaps during forward flight of said craft, while the location of said propellers relative to said body of said craft maintain the stable direction of said craft and the equal speed of revolution of said propellers in the surrounding air.

2. The craft of claim 1, wherein a control means is provided to effect the inclination of the longitudinal axis of the craft relative to the horizon and wherein said flaps are subjected to opening and closing of said flaps at respective portions of the revolution of the respective propeller with said opening effective at those angles of rotation of the repsective blade of the respective propeller at which the surrounding air flows from the rear of the respective blade against the respective arm and flap of the respective blade of the respective propeller of said propellers.

3. The craft of claim 2, wherein said flap is provided swingably on the rear portion of the chord of the respective blade of said propeller, wherein said flap is subjected to the flow and resistance of the surrounding fluid wherein said propeller revolves, wherein said flap is aligned to the airfoil profile of said propeller when said propeller moves with its tip forward in said surrounding fluid while said flap opens when the respective of said propeller on which said flap is provided is moved with its rear end against said surrounding fluid.

4. The craft of claim 3,
wherein said body is provided with at least one pair of shafts with each one of said propellers on the respective shaft,
wherein one of said shafts with one of said propellers is provided on the left side of said body and the other shaft and propeller on the right side of said body,
wherein said body moves forward in said surrounding fluid,
wherein said propellers are arranged to revolve in opposite rotary directions,
wherein each of said blades of said propellers has relative to said movement of said body in said surrounding fluid a forward swing and a rearward swing at each of the respective revolution of the respective propeller,
whereby the respective blades of said propellers move faster than said body at said forward swings in said surrounding fluid while the respective blades of said propellers move slower than said body at said rearward swings in said surrounding fluid, and,
wherein said surrounding fluid closes said flaps at said faster movements while said surrounding fluid flows against said flaps at said slower movements to open said flaps by swinging them outwards from said blades of said propellers and thereby subjecting said flaps to a driving force by said surrounding fluid,
whereby said propellers are driven around by said flaps at said slower movements.

5. The craft of claim 4,
wherein said body is provided with two pairs of said pair with one of said pairs in the front portion and the other of said pair in the rear portion of said body,
wherein said body has a weight which tends under the force of the gravity of the planet to force said body downwards while said movement of said body relative to said surrounding fluid which drives said propellers by said flaps to revolve provides by said revolving of said propellers a lift to said body which is contrary directed relative to the downward force of said gravity,
whereby said body moves under said oppositionally directed up and down directed forces in a direction forward and slightly inclined downward relative to the direction of the horizon of said planet.

6. The craft of claim 5,
wherein said craft is an aircraft which is provided with said power plant to revolve said shafts with said propellers and with a control means to direct the inclination of the longitudinal axis of said body relative to said horizon,
whereby said body of said aircraft can be directed to incline downward in forward flight direction, and,
wherein at times when said power plant fails said control means is able to incline said body forwardly downward in order to increase the forward speed of said body under said force of said gravity whereby said increased forward speed of said body is utilized to increase the driving force on said flaps at said rearward swings in order to obtain an increase of lift of said blades of said propellers at said forward swings,
whereby said aircraft becomes able to glide by the lifts of said propellers in a slightly downwardly inclined flight path relatively to the horizon.

7. The craft of claim 6,
wherein a free wheeling arranged is provided between said shafts and said propellers to permit an overrun of the respective propeller over the slower revolution of said shafts driven by said power plant.

8. The craft of claim 7,
wherein guide means are provided relative to said propellers to permit said closing of said flaps at one portion of a revolution of the respective propeller and to open said flaps away from said airfoil configuration of the respective blade of the respective propeller at another portion of the respective revolution of the respective propeller.

9. The craft of claim 8,
wherein said flaps consist of pairs of flaps which are swingably borne on the roots of said flaps to swing one of said flaps of a pair of said flaps upwards and the other flap of the same pair of flaps downwards at said respective rearward strokes.

10. The craft of claim 9,
wherein springs are provided to said flaps to close said flaps at said forward swings while the force of said springs is limited to such a force that said force will be overcome during said rearward swings to open said flaps at said rearward swings against said force of said springs.

11. The aircraft of claim 1,
wherein said craft is a helicopter and becomes a glider, gliding forwards with an acceptable small rate of descent under the lift of said propellers when said power plant fails to supply sufficient power to revolve said propellers with sufficient rotary velocity to keep said craft in a substantially horizontal flight path with said small rate of descent.

* * * * *